United States Patent
Piper et al.

(10) Patent No.: US 7,342,812 B2
(45) Date of Patent: Mar. 11, 2008

(54) SWITCH MODE POWER SUPPLY SYSTEMS

(75) Inventors: Johan Piper, Cambridgeshire (GB);
David M. Garner, London (GB);
David Robert Coulson, Comberton (GB)

(73) Assignee: Cambridge Semiconductor Limited, Cambridge Cambridgeshire (GB)

( * ) Notice: Subject to any disclaimer, the term of this patent is extended or adjusted under 35 U.S.C. 154(b) by 0 days.

(21) Appl. No.: 11/490,864

(22) Filed: Jul. 21, 2006

(65) Prior Publication Data
US 2008/0007977 A1    Jan. 10, 2008

(51) Int. Cl.
*H02M 3/335* (2006.01)
*H02M 7/5395* (2006.01)

(52) U.S. Cl. ............... 363/21.16; 363/21.11; 363/21.18

(58) Field of Classification Search ......... 363/21.01, 363/21.08, 21.09, 21.16, 21.17, 97, 131, 363/21.07, 21.18
See application file for complete search history.

(56) References Cited

U.S. PATENT DOCUMENTS

| | | | |
|---|---|---|---|
| 4,439,822 A | 3/1984 | Cocconi | |
| 4,672,516 A | 6/1987 | Ney et al. | |
| 5,940,281 A | 8/1999 | Wolf | |
| 6,301,135 B1 | 10/2001 | Mammano et al. | |
| 6,333,624 B1 | 12/2001 | Ball et al. | |
| 6,373,726 B1 | 4/2002 | Russell | |
| 6,385,059 B1 | 5/2002 | Telefus et al. | |
| 6,590,789 B2 | 7/2003 | Bailly | |
| 6,625,042 B2 | 9/2003 | Tolle et al. | |
| 6,707,283 B1 | 3/2004 | Ball | |
| 6,721,192 B1 | 4/2004 | Yang et al. | |
| 6,781,357 B2 | 8/2004 | Balakrishnan et al. | |
| 6,833,692 B2 | 12/2004 | Balakrishnan et al. | |
| 6,836,415 B1 | 12/2004 | Yang et al. | |
| 6,842,350 B2 * | 1/2005 | Yamada et al. | 363/21.16 |

(Continued)

FOREIGN PATENT DOCUMENTS

EP    0636889 A1    2/1995

(Continued)

OTHER PUBLICATIONS

Coulson, D. R., et al., "Switch Mode Power Supply Controllers", U.S. Appl. No. 11/445,473, filed Jun. 1, 2006.

(Continued)

*Primary Examiner*—Gary L Laxton
(74) *Attorney, Agent, or Firm*—Schwegman, Lundberg & Woessner P.A.

(57) ABSTRACT

Methods and apparatus for sensing the output current in a switch mode power supply (SMPS) using primary side sensing are described. A module senses a current in a primary winding of a transformer and a voltage on a primary or auxiliary winding of the transformer, and which includes a multiplier coupled to an output of a signal averager averaging a primary winding current and to an output of a timing signal generator using the sensed voltage to signal when a secondary winding is powering an output of the SMPS, to multiply an averaged current sense signal by a fraction of a total cycle period of said SMPS during which the secondary winding is providing power to provide a signal estimating an output current of the SMPS.

22 Claims, 9 Drawing Sheets

U.S. PATENT DOCUMENTS

| | | | |
|---|---|---|---|
| 6,853,563 | B1 | 2/2005 | Yang et al. |
| 6,862,194 | B2 | 3/2005 | Yang et al. |
| 6,862,198 | B2 | 3/2005 | Muegge et al. |
| 6,882,552 | B2 | 4/2005 | Telefus et al. |
| 6,900,995 | B2 | 5/2005 | Muegge et al. |
| 6,956,750 | B1 | 10/2005 | Eason et al. |
| 6,958,920 | B2 | 10/2005 | Mednik et al. |
| 6,972,969 | B1 | 12/2005 | Shteynberg et al. |
| 6,977,824 | B1 | 12/2005 | Yang et al. |
| 6,985,368 | B2 | 1/2006 | Park |
| 6,999,324 | B2 | 2/2006 | Feldtkeller |
| 7,016,204 | B2 | 3/2006 | Yang et al. |
| 7,027,312 | B2 | 4/2006 | Park |
| 7,088,599 | B1 | 8/2006 | Muska et al. |
| 7,116,564 | B2 | 10/2006 | Takahashi |
| 7,248,487 | B1 | 7/2007 | de Silva et al. |
| 2002/0015315 | A1 | 2/2002 | Telefus |
| 2004/0174209 | A1 | 9/2004 | Makino et al. |
| 2004/0196936 | A1 | 10/2004 | Kawama et al. |
| 2005/0024898 | A1 | 2/2005 | Yang et al. |
| 2005/0073862 | A1 | 4/2005 | Mednik et al. |
| 2005/0169017 | A1 | 8/2005 | Muegge et al. |
| 2005/0276083 | A1 | 12/2005 | Berghegger |
| 2005/0285587 | A1 | 12/2005 | Yang et al. |
| 2006/0034102 | A1 | 2/2006 | Yang et al. |
| 2006/0050539 | A1 | 3/2006 | Yang et al. |
| 2006/0055433 | A1 | 3/2006 | Yang et al. |
| 2006/0056204 | A1 | 3/2006 | Yang et al. |
| 2006/0077697 | A1 | 4/2006 | Yang |
| 2007/0121349 | A1 | 5/2007 | Mednik et al. |
| 2007/0133234 | A1 | 6/2007 | Huynh et al. |

FOREIGN PATENT DOCUMENTS

| | | |
|---|---|---|
| JP | 10-69515 | 3/1998 |
| WO | WO-86/03902 A1 | 7/1986 |
| WO | WO-02/063777 A2 | 8/2002 |
| WO | WO-03/047079 A2 | 6/2003 |
| WO | WO-2004/051834 A1 | 6/2004 |
| WO | WO-2004/82119 A2 | 9/2004 |
| WO | WO-2004/112226 A1 | 12/2004 |
| WO | WO-2004/112227 A1 | 12/2004 |
| WO | WO-2004/112229 A1 | 12/2004 |
| WO | WO-2005/011095 A1 | 2/2005 |
| WO | WO-2005/048442 A1 | 5/2005 |
| WO | WO-2006/067522 A2 | 6/2006 |
| WO | WO-2006/067523 A2 | 6/2006 |
| WO | WO-2007/003967 A2 | 1/2007 |

OTHER PUBLICATIONS

Garner, D. M., et al., "Switch Mode Power Supply Controllers", U.S. Appl. No. 11/445,482, filed Jun. 1, 2006.

Indika de Silva, M. D., et al., "Switch Mode Power Supply Controllers", U.S. Appl. No. 11/810,739, filed Jun. 7, 2007.

Lalithambika, V. A., et al., "Switch Mode Power Supply Controllers", U.S. Appl. No. 11/445,476, filed Jun. 1, 2006.

"Partial International Search Report for corresponding PCT Application No. PCT/GB2007/050387 mailed Oct. 16, 2007", 4 pgs.

"Partial International Search Report for PCT Application No. PCT/GB2007/050388 mailed Oct. 16, 2007", 1 pg.

* cited by examiner

SWITCH MODE POWER SUPPLY SYSTEMS

RELATED APPLICATION

This application claims priority under 35 U.S.C. 119 from United Kingdom Application No. 0613484.5 filed 7 Jul. 2006, which application is incorporated herein by reference.

FIELD OF THE INVENTION

This invention generally relates to methods and apparatus for sensing the output current in a switch mode power supply (SMPS), in particular using primary side sensing.

BACKGROUND TO THE INVENTION

We will describe improved techniques which enable the design of a Switch Mode Power Supply with a relatively accurately controlled output current limit which, in embodiments, do not need current sensing components on the secondary side of the power supply.

Many SMPS applications require the output current to be either limited to, or maintained at a particular value. One way of achieving this is by including some form of output current sensing, located on the secondary side of the converter, communicating this information back to the power converter controller located on the primary side. This provides an accurate method of current sensing but incurs the cost of additional secondary side components.

A relatively crude current limiting may be implemented by monitoring and limiting the primary side switch current to a particular value. The accuracy may be improved by sensing and integrating the current through the primary switch, correlating the time constant of the integrator to the switching period, in this way estimating the output current. However, the accuracy of output current sensing in this way is dependent, among other things, upon the efficiency of power conversion, the switching time of the switch and the like.

Background prior art relating to SMPS output current control can be found in: U.S. Pat. No. 6,833,692: Method and apparatus for maintaining an approximate constant current output characteristic in a switched mode power supply; U.S. Pat. No. 6,781,357: Method and apparatus for maintaining a constant load current with line voltage in a Switch Mode Power Supply; U.S. Pat. No. 6,977,824: Control circuit for controlling output current at the primary side of a power converter; U.S. Pat. No. 6,862,194: Flyback power converter having a constant voltage and a constant current output under primary-side PWM control; U.S. Pat. No. 6,853,563: Primary-side controlled flyback power converter; U.S. Pat. No. 6,625,042: Power supply arrangement comprising a DC/DC converter with primary-side control loop; U.S. Pat. No. 7,016,204: close-loop PWM controller or primary-side controlled power converters; and EP 0 636 889A. This latter document asserts that the average current flowing through the power switch (of an SMPS) during its conduction interval is substantially proportional to the output current of the power supply, with the proportionality factor precisely known and constant, but this is in fact true if and only if the input voltage to the SMPS is constant.

Improved techniques for sensing the output current of an SMPS, and for measuring the output current by means of primary side sensing are described.

SUMMARY OF THE INVENTION

According to an embodiment of the present invention there is therefore provided a module for estimating the output current of a switch mode power supply (SMPS), said SMPS including a transformer with at least a primary winding coupled to an input of the SMPS and a secondary winding coupled to an output of the SMPS and having a power switching device to switch power to said primary winding of said transformer responsive to a drive signal, the module comprising: a current sense input to receive a current sense signal sensing a current in said primary winding of said transformer; a voltage sense input to receive a voltage sense signal from said primary or an auxiliary winding of said transformer, a drive signal input to receive said drive signal; a signal averager coupled to said drive signal input and to said current sense input to average said current sense signal over a period when said drive signal is controlling said power switching device to apply power to said primary winding and to provide an averaged current sense signal; a timing signal generator coupled to said voltage sense input to generate a timing signal indicating a duration of a period during which said secondary winding is providing power to said SMPS output; a multiplier coupled to an output of said signal averager and to an output of said timing signal generator to multiply said averaged current sense signal by a fraction of a total cycle period of said SMPS during which said secondary winding is providing power to said SMPS output, indicated by said timing signal; and an output coupled to an output of said multiplier to provide a signal estimating said output current of said SMPS.

Broadly speaking in embodiments, the module determines the average current into the primary side of the transformer or similar magnetic energy storage device during "charging" of the transformer, that is building up energy stored in a magnetic field prior to discharge on the secondary side. The result is then multiplied by the secondary side discharge time expressed as a fraction of the total cycle time of the SMPS, that is multiplying the result by $T_{discharge}/T_{total}$. In some embodiments the averager is implemented using a low-pass filter to average a current sense input signal, for example a voltage across a current sense resistor for in some other way, for example using a current sensing transformer. In embodiments, the multiplying is also performed using a low-pass filter, in particular by employing a switch to selectively couple the input of a low-pass filter either to the value to be multiplied or to a reference level such as ground. By driving this switch with a control signal which has an on period (to couple the input of a low-pass filter to the signal to be scaled) which is proportional to the secondary side discharge time, that is providing a control signal with a duty time substantially equal to $T_{discharge}/T_{total}$, the average primary side current during charging of the transformer can be scaled by the discharge time as mentioned above.

In embodiments of the module which employ one or more low-pass filters the time constant or time constants of the low-pass filters are preferably greater, for example ten times greater than the period over which the filter is averaging. Thus the low-pass filter averaging the primary side charging current should preferably have a time constant which is greater than the on time of the switch drive signal, and the time constant of a low-pass filter implementing the multiplier function should be greater than the (maximum) total cycle time of the SMPS. Therefore, in some preferred embodiments, one or both of these low-pass filters may be implemented using a switched capacitor circuit. In some particularly preferred embodiments one or both of these low-pass filters include a time-sliced resistive component to, effectively, make a resistor of the low-pass filter appear to have a larger value than in fact it has. This facilitates achieving the desirable length of time constant for a low-pass filter in this circuit.

The secondary side discharge time may be determined using one of a range of methods, examples of which are described later. However in embodiments the discharge time may be determined by a timing signal generator which comprises a comparator to compare the voltage sensed from the primary or from an auxiliary winding of the transformer with a reference to generate a timing signal. The reference may either be a fixed reference, for example a zero crossing, or may comprise a reference from an output voltage model for the SMPS, or some other reference.

The invention further provides an SMPS controller including an output current estimating module as described above. In preferred embodiments the controller includes a control module to compare the estimated output current with a target or reference output current, for controlling the SMP responsive to a difference between these two values. The SMPS may, for example comprise an oscillator driving the power switching device, and the controller may control either or both of a pulse width and a pulse frequency of the oscillator. In some preferred embodiments the control module has a zero which is configured to suppress a pole of the output current estimating module, more particularly a pole of a low-pass filter in the estimating module. In embodiments this helps to simply the control loop and hence facilitates achieving improved SMPS control.

The invention further provides an SMPS including a module and/or controller as described above.

Embodiments of the invention may be employed with a wide variety of SMPS topologies including, but not limited to, a flyback converter and a direct-coupled boost converter. The transformer may comprise a conventional transformer or an auto-transformer and the secondary side voltage may be sensed either on the primary winding (for example, using a potential divider where this voltage is high) or using an auxiliary winding on the transformer.

The SMPS may operate in either a Discontinuous Conduction Mode (DCM) or in a Continuous Conduction Mode (CCM) or at the boundary of the two, in a Critical Conduction Mode.

In a related aspect the invention provides a method of estimating an output current an SMPS, said SMPS including a transformer with a least a primary winding coupled to an input of the SMPS and a secondary winding coupled to an output of the SMPS, the method comprising: sensing a current in said primary winding of said transformer; averaging a signal from said sensed current over a period when current is flowing in said primary winding to provide an average current signal; determining an estimate of a discharge time of current through said secondary winding of said transformer; and scaling said average current signal using said discharge time to estimate said SMPS output current.

The invention still further provides as a system for estimating an output current of an SMPS, said SMPS including a transformer with at least a primary winding coupled to an input of the SMPS and a secondary winding coupled to an output of the SMPS, the system comprising: an input for sensing a current in said primary winding of said transformer; an averager for averaging a signal from said sensed current over a period when current is flowing in said primary winding to provide an average current signal; a system for determining an estimate of a discharge time of current through said secondary winding of said transformer; and a system for scaling said average current signal using said discharge time to estimate said SMPS output current.

The skilled person will understand that the above-described aspects and embodiments of the invention may be implemented using either digital or analogue hardware or a combination of the two. However some preferred embodiments are particularly convenient for substantially analogue implementation.

In a still further aspect the invention provides a switched capacitor resistor, said switched capacitor resistor comprising: first and second switched capacitor resistor terminals; a common terminal; an intermediate terminal; a capacitor coupled between said intermediate terminal and said common terminal; and a first controllable switch coupled between said first terminal and said intermediate terminal; a second controllable switch coupled between said second terminal and said intermediate terminal; and at least one resistor connected in series with one of said first and second switches between one of said first and second terminals and said intermediate terminal.

In general a controller will be provided to provide non-overlapping control signals for the two switches to control the first switch so that current flows from the first terminal onto the capacitor through a first resistor, and then off the capacitor through a second resistor to the second terminal. In an embodiment, the control signals are preferably substantially non-overlapping so that charge is inhibited from flowing directly from the first to the second terminal.

This aspect of the invention also provides a method of implementing a switched capacitor resistor, the method comprising including at least one resistive component in said switched capacitor resistor and time-slicing said resistive component using a time-slicing signal having a duty cycle of less than 100% on time, to increase an effective value of said resistive component.

BRIEF DESCRIPTION OF THE DRAWINGS

These and other aspects of the invention will now be further described, by way of example only, with reference to the accompany figures in which.

DETAILED DESCRIPTION OF PREFERRED EMBODIMENTS

Broadly speaking we will describe techniques for estimating current on the secondary side of a transformer in a switched mode power supply (SMPS) using low-pass filters. The techniques we describe average the primary-side current twice in two time dominions, the discharge-time (on the secondary-side) and the charge-time (on the primary-side).

In embodiments the drive signal for the power switch is used for sensing the charge-time, the current time on the primary-side is used for sensing the average of the primary current and the reflected voltage from the secondary winding is used for sensing the discharge time on the secondary-side. The low-pass filters are implemented using a modified switched-capacitor scheme to reduce the overall size of the passive components in an embodiment.

Figure 1:
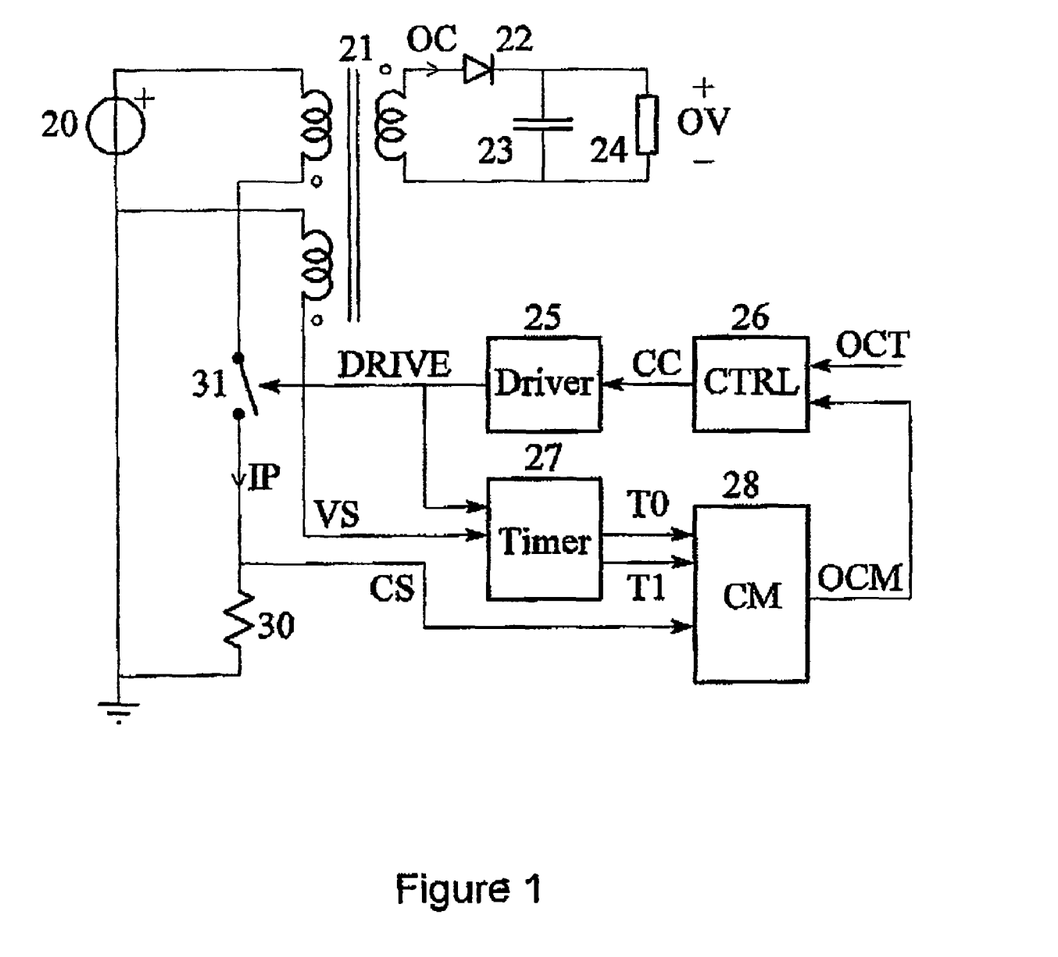
FIG. 1 shows an example of a switch mode power supply incorporating an embodiment of an SMPS output current estimation module according to the invention.

Referring to FIG. 1 this shows a simplified block diagram of a typical single-switch flyback SMPS. A DC source 20 is connected to the primary winding of a transformer 21 in series with a primary side switch 31 and a current sensing resistor 30. The secondary winding of the transformer 21 is connected to an output diode 22 in series with a capacitor 23. A load 24 is connected across the output capacitor 23. An auxiliary winding on the transformer 21 is connected between the negative terminal of the DC supply 20 and the timer 27 generating the voltage-sense signal VS. The primary current IP produces a voltage across resistor 30, generating the current-sense signal CS. The Driver 25 controls the on-times and the off-times of the switch 31 with the DRIVE signal.

The timer block 27 generates two timing signals, T0 and T1, by sensing the DRIVE, VS, and CS signals. T0 represents the charge-time, i.e. the time when a current is flowing through the primary side of the transformer 21. T1 represents the discharge-time, i.e. the time when a current is flowing through the secondary side of the transformer 21.

The signals T0, T1 and CS, are used in the current model (CM) block 28 to produce an output current model signal OCM which estimates the output current of the SMPS. The (constant) OCT signal represents the target output current of the secondary winding. OCM and OCT are used in the control block 26 to control the driver 25 in such a way that the OCM signal converges towards OCT.

Figure 2:
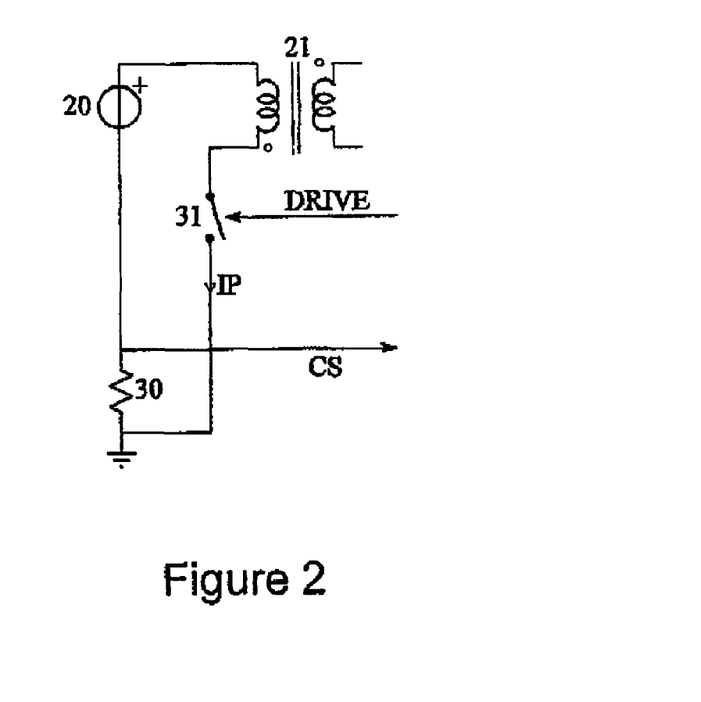
FIG. 2 shows an alternative current sensing arrangement for the SMPS of FIG. 1.
Figure 3:
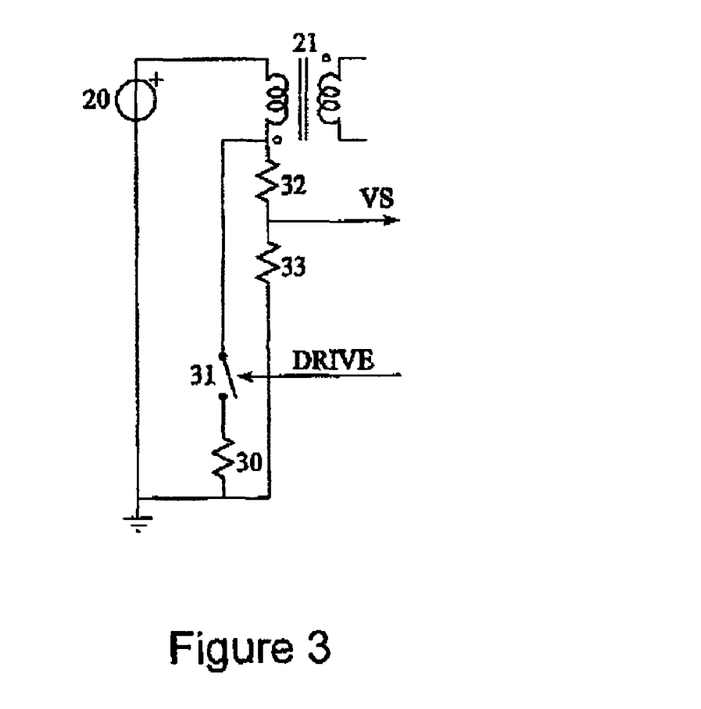
FIG. 3 shows an alternative voltage sensing arrangement for the SMPS of FIG. 1.

One alternative way to sense the current is to put the current sensing resistor 31 in the return path, as shown in FIG. 2. One alternative way to sense the voltage is to use a resistive divider (resistors 32 and 33) on the primary, as shown in FIG. 3, thus eliminating the auxiliary winding.

Timer Block

Figure 4:
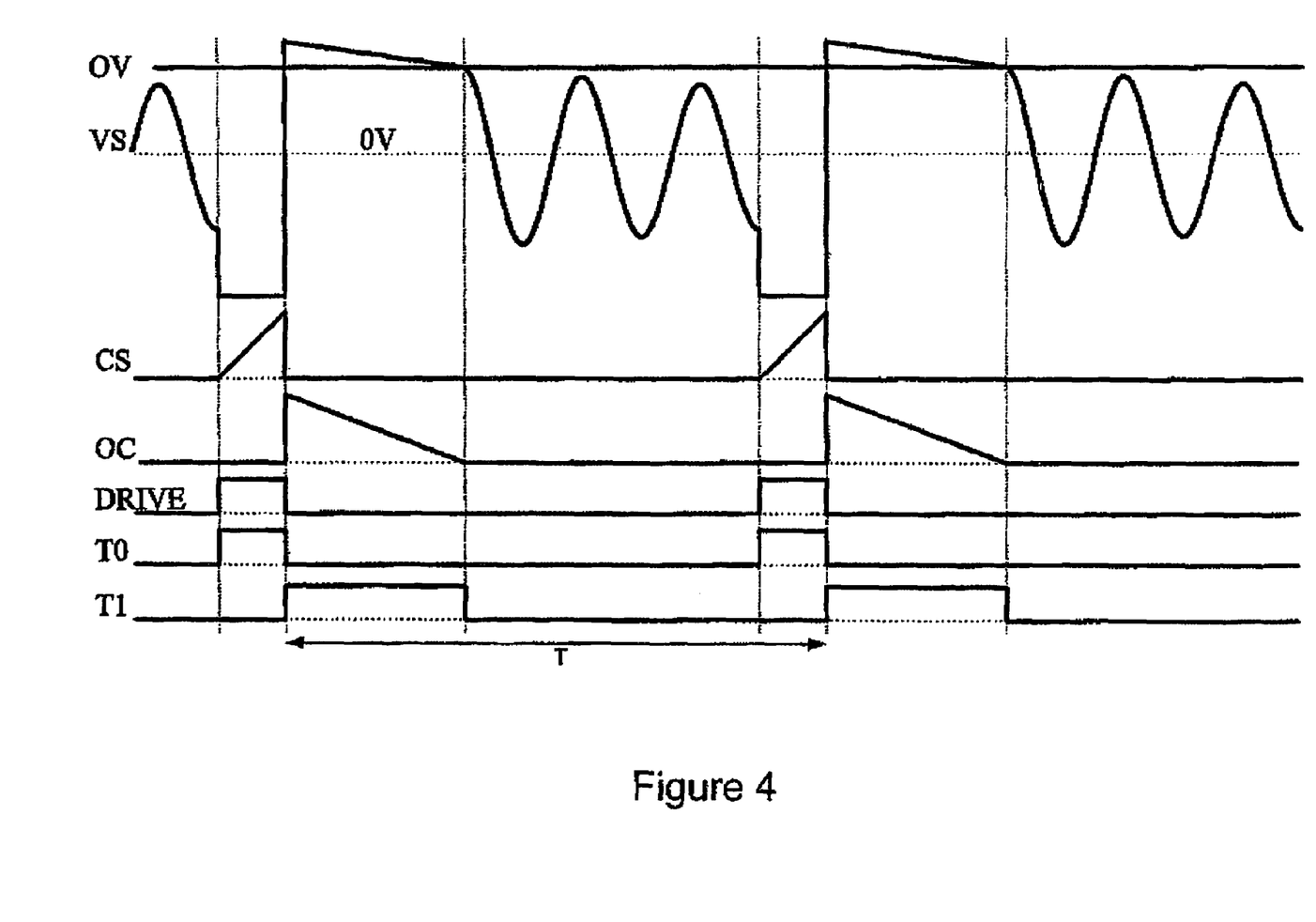
FIG. 4 shows a set of waveforms illustrating the operation of the SMPS of FIG. 1.

The timer block 27 generates two timing signals, T0 and T1, by sensing the DRIVE, VS and CS signals. T0 represents the charge-time, i.e. the time when a current is flowing through the primary side of the transformer 21. T1 represents the discharge-time, i.e. the time when a current is flowing through the secondary side of the transformer 21. The waveforms of the signals are plotted in FIG. 4.

Figure 5:
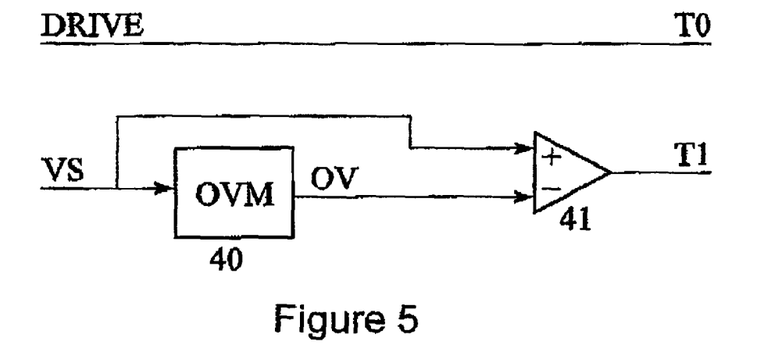
FIG. 5 shows an example implementation of the timing signal generator (timer) module of FIG. 1.

FIG. 5 shows one example implementation of the timer block 27. In this example the signal DRIVE is used directly for generating T0 and the reflected secondary-side voltage sensed on the auxiliary (or primary) winding of transformer 21 is used to generate the discharge-time signal T1. It is preferable to employ primary-side sensing for the discharge time since this enables the construction of an SMPS in which only primary-side sensing is employed. Nonetheless, in other embodiments secondary side sensing may be employed to determine the discharge time.

FIG. 5 shows one way in which the discharge time may be determined, using an output voltage model (OVM) block 40 which has an output, OV, which approximates the output voltage of the SMPS (see FIG. 4) and which can be compared with the sensed voltage signal VS by comparator 41 to generate signal T1. In general, an SMPS controller which incorporates primary-side sensing for output voltage regulation will already include some form of output voltage models.

A simple alternative to the use of an output voltage model per se is simply to compare the sensed voltage waveform with a reference level in order to generate the discharge-time signal T1.

Some further techniques which may be used to generate T1 are described. Referring again to FIG. 4 (DCM mode) it can be seen that the OC waveform falls to zero at the knee in the curve of VS (auxiliary winding voltage) against time. This is also the time at which the secondary side current falls to zero. Following this point VS exhibits ringing, first passing through zero at point, a quarter of a cycle of the ringing on (later) than the knee point. The knee of the VS curve can be identified, for example using the techniques described in PCT/GB2005/050242 (incorporated by reference); or the zero crossing can be identified and (for example by keeping sampled values of VS in a shift register) the point a quarter of a ringing cycle before this can be identified to generate a transition of T1 (once the period of the ringing cycle has been measured); or T1 may be initiated by the opening of the power switch (signal T0) and terminated by the first zero crossing, which approximates the true knee position.

Output Current Model Theory

It is helpful first to consider some theory underlying embodiments of the invention.

Figure 11:
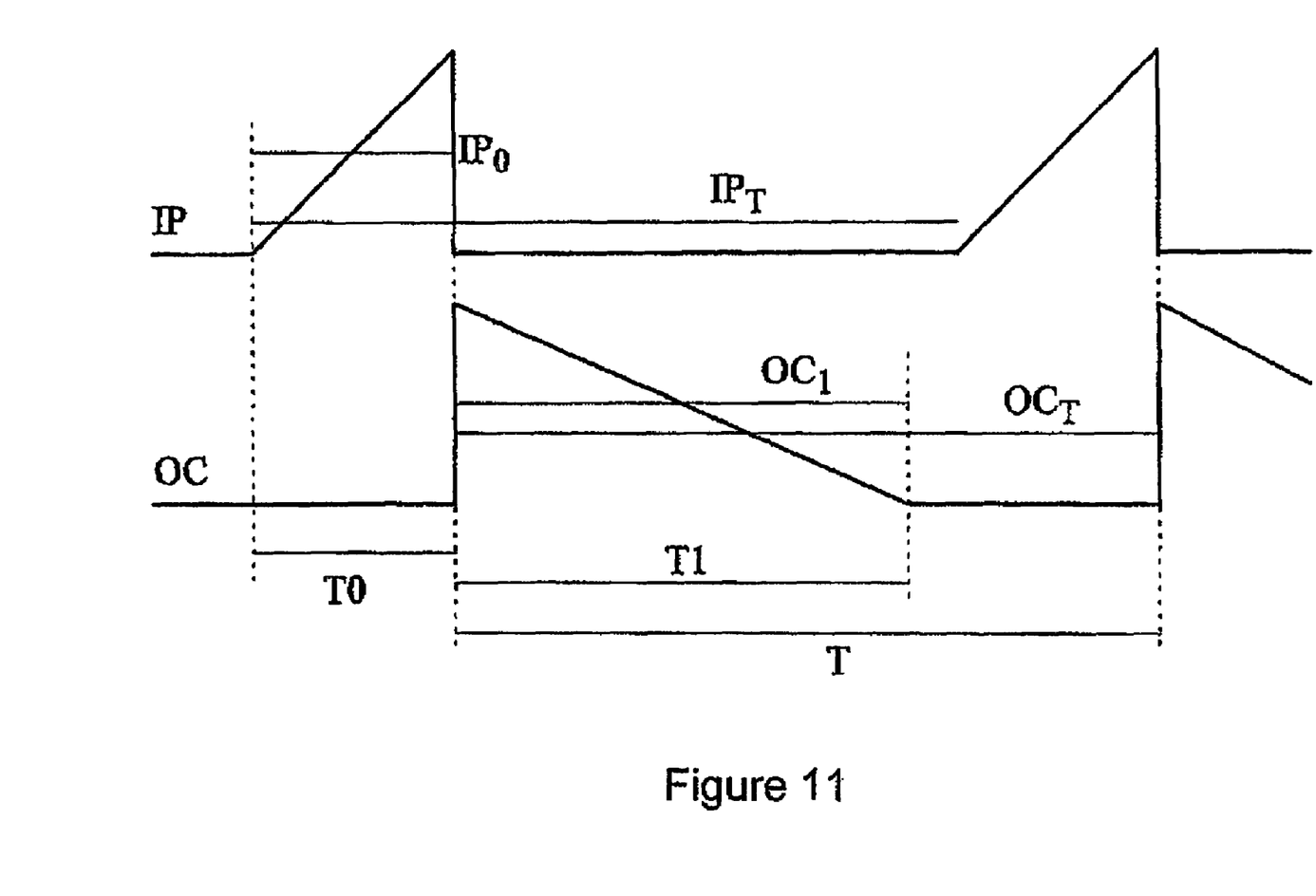
FIG. 11 shows primary-side charge and secondary-side discharge waveforms for an SMPS as shown in FIG. 1 operating in a Discontinuous Conduction Mode (DCM), illustrating average primary- and secondary-side currents.

The relation between the primary and the secondary winding of the transformer 21 can be used for estimating the output current. A plot of the input (IP) and output (OP) currents is shown in FIG. 11. The average of the current in the primary winding during $t_0$ (IP$_0$) equals the average of the current in the secondary winding during $t_1$ (OC$_1$):

$$nIP_0 = n\frac{1}{T0}\int_{T0} IP\,dt = \frac{1}{T1}\int_{T1} OC\,dt = OC_1 \qquad \text{Equation 1}$$

where n is the turns-ratio between the secondary and primary winding (i.e. number of primary turns÷number of secondary turns). The average output current for the whole (SMPS cycle) period T(OC$_T$) is:

$$OC_T = \frac{1}{T}\int_{T_1} OC\,dt = OC_1\frac{T1}{T} = nIP_0\frac{T1}{T} \qquad \text{Equation 2}$$

The average output current can also be rewritten in terms of the average input current over period T, $IP_T$ using the equality:

$$IP_0 = \frac{1}{T0}\int_{T0} IP\,dt = \frac{T}{T0}\frac{1}{T}\int_T IP\,dt = \frac{T}{T0}IP_T \qquad \text{Equation 3}$$

Now the average output current can be calculated from:

$$OC_T = nIP_0\frac{T1}{T} = nIP_T\frac{T1}{T0} \qquad \text{Equation 4}$$

Current Model Block

Returning now to the CM block 28, the equation for estimating the output current is:

$$OCM = \frac{T1}{T}\frac{1}{T0}\int_{T0} CS\,dt = \frac{1}{T}\int_{T1}\left(\frac{1}{T0}\int_{T0} CS\,dt\right)dt$$

Figure 6:
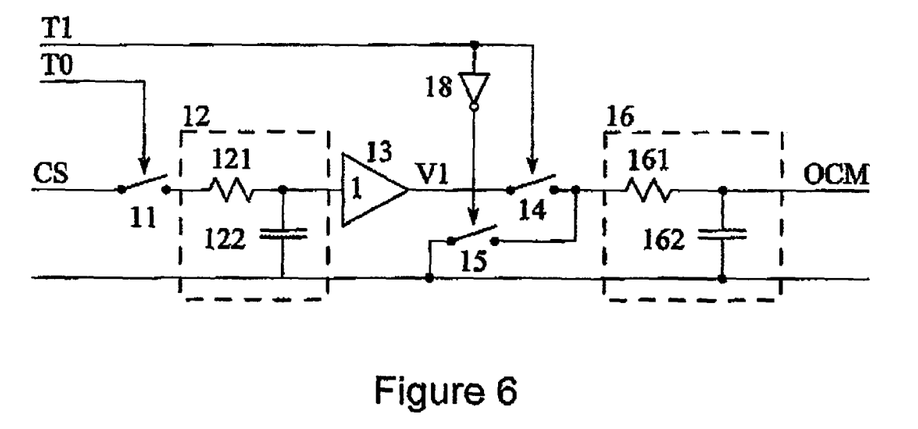
FIG. 6 shows an example implementation of the current model (CM) module of FIG. 1 using low-pass filters.

Here the output current model is derived by averaging the CS signal twice and the turns ratio is normalised out. The integral over T0 calculates $IP_0$; the integral over T1 multiplied by 1/T effectively multiplies by T1/T. In embodiments the turns ratio is a programmable parameter set according to the transformer used. An implementation of the filter is shown in FIG. 6. The CS signal is averaged during T0 in the first low-pass filter 12 (formed by the resistor 121 and the capacitor 122). Note that the input of the first low-pass filter 12 is high impedance when T0 is low by the action of the switch 11. Therefore CS is averaged only when T0 is high, otherwise the voltage is held on the capacitor 122. The output signal of the first low-pass filter 12 is buffered by 13 to produce the signal V1. V1 is then multiplied by T1 over T (T1 effectively providing both T1 and T) by switching the second low-pass filter 16 (formed by the resistor 161 and the capacitor 162) between ground and V1. The switches 14 and 15 are turned on by T1 and the inverse of T1 respectively.

In order for the averaging to be accurate the time constants of the low-pass filters 12 and 16 should be longer than the maximal integration times, that is:

$$\begin{cases} \tau = R_{121}C_{122} \gg T0_{MAX} \\ \tau_{16} = R_{161}C_{162} \gg T_{MAX} \end{cases}$$

Switched-Capacitor Implementation

Figure 7:
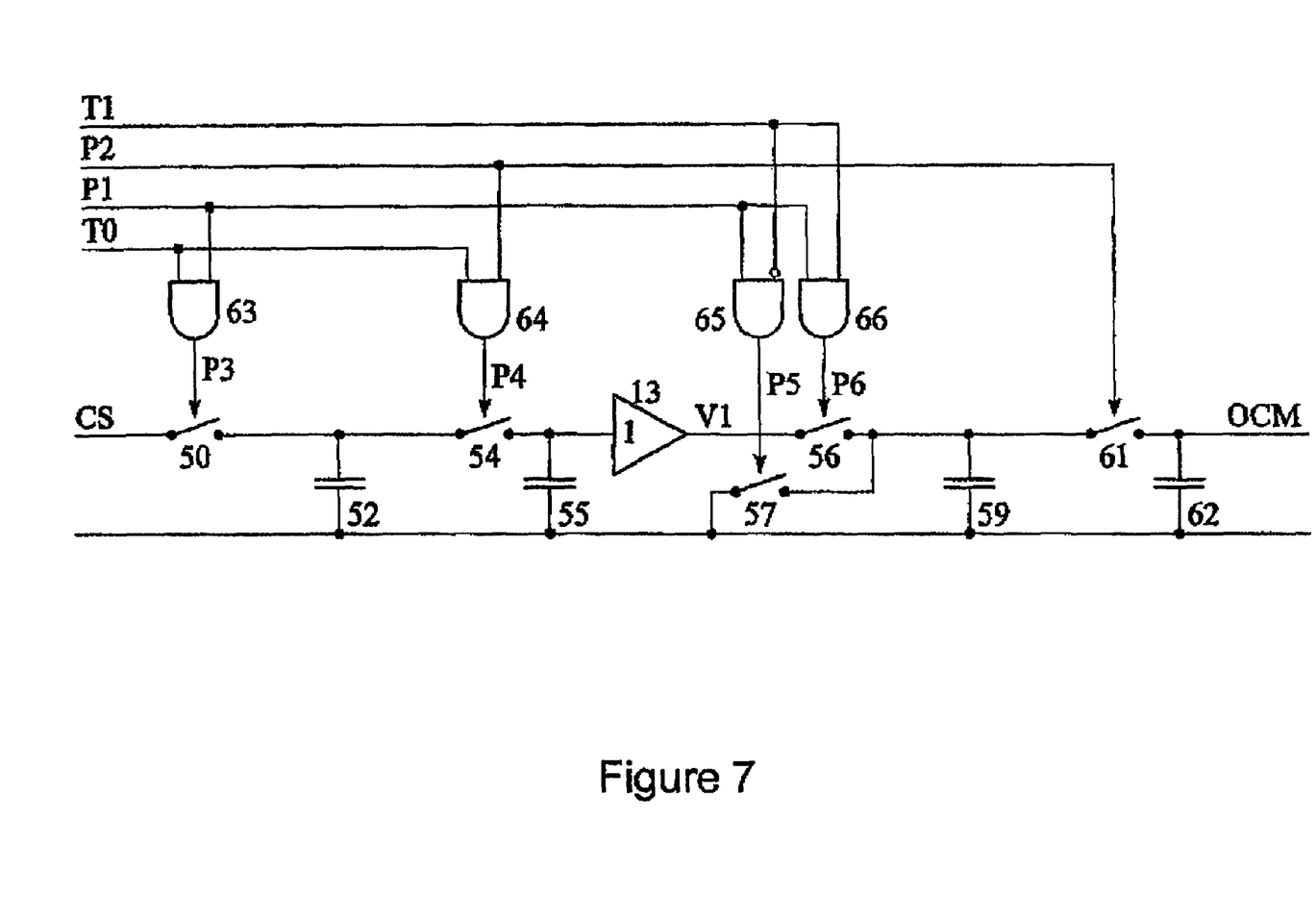
FIG. 7 shows an example implementation of the low-pass filter based current model of FIG. 6 using a switched-capacitor circuit.
Figure 9:
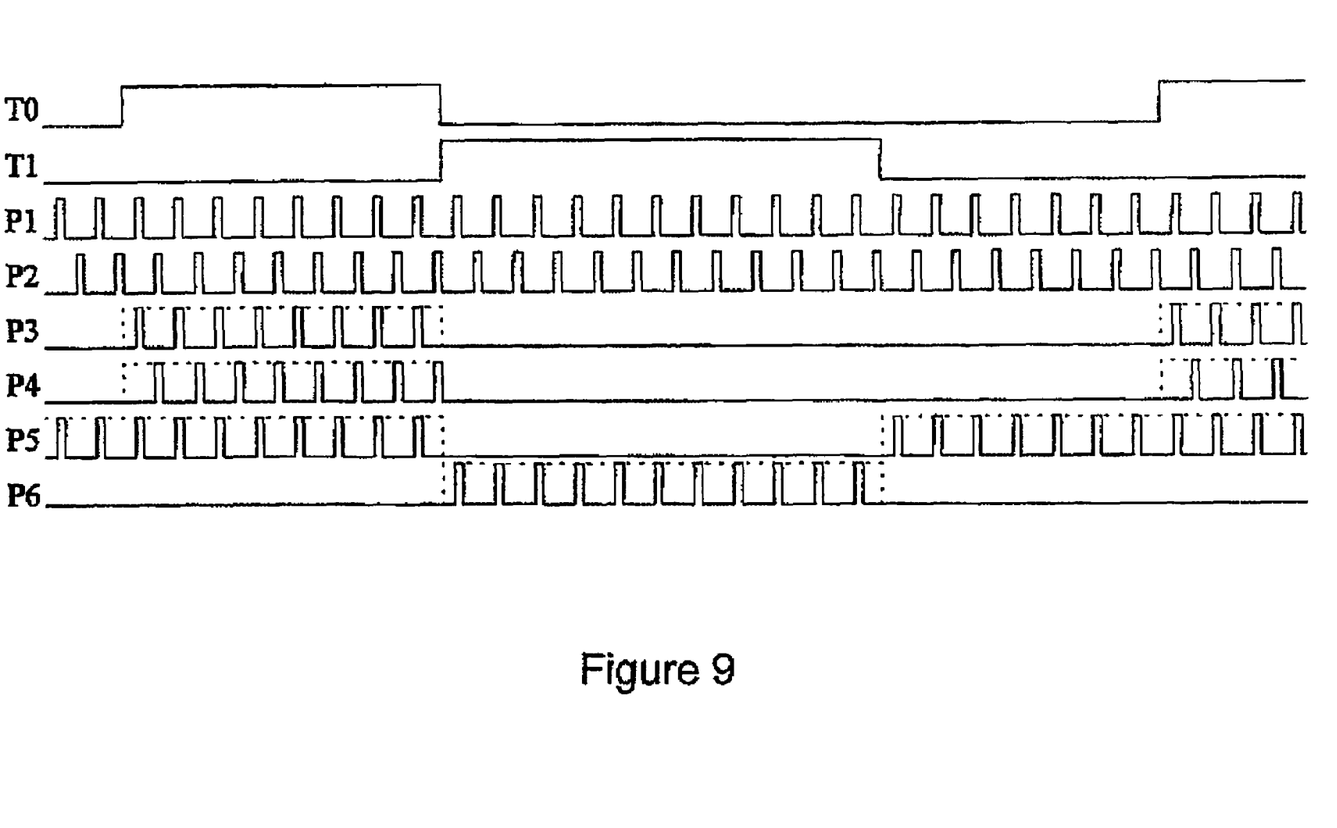
FIG. 9 shows timing signal and switched control waveforms for the circuits of FIGS. 7 and 8.

Since the time constants of the low-pass filters 12 and 16 is approaching milliseconds the size of the resistors and capacitors 121, 122, 161, 162 can become unrealistically large if implemented in an integrated circuit. One alternative is to use a switched capacitor (SC) circuit, as shown in FIG. 7. The waveforms of the signals T0, T1, P1 and P2 are shown in FIG. 9. The signals P1 and P2 are non-overlapping clocks operating at the frequency $f_s$.

In the circuit of FIG. 7 switches 50, 54 and capacitor 52 form a switched capacitor resistor similar to resistor 121 of FIG. 6, and capacitor 55 corresponds to capacitor 122 of FIG. 6. Switches 56 and 57 perform a similar function to switches 14 and 15 of FIG. 6, capacitor 62 corresponds to capacitor 162 of FIG. 6 and switches 56, 57 and 61 together with capacitor 59 perform the function of resistor 161 of FIG. 6.

The time constants for the SC low-pass filters are $$\begin{cases} \tau_{12} = \dfrac{C_{55}}{f_s C_{52}} \gg T0_{MAX} \\ \tau_{16} = \dfrac{C_{62}}{f_s C_{59}} \gg T_{MAX} \end{cases}$$

However in embodiments this still might not be sufficient because the switching frequency should be high to sample the shortest CS signal accurately $$f_s \gg \frac{1}{T0_{MIN}}$$

For example, if the time constants are chosen $\tau_{12}=10T0_{MAX}$, $f_s=10/T0_{MIN}$ and the ratio between the maximum and minimum discharge time $T0_{MAX}/T0_{MIN}=20$ then the ratio between the capacitors 55 and 52 would become 2000.

Figure 8:
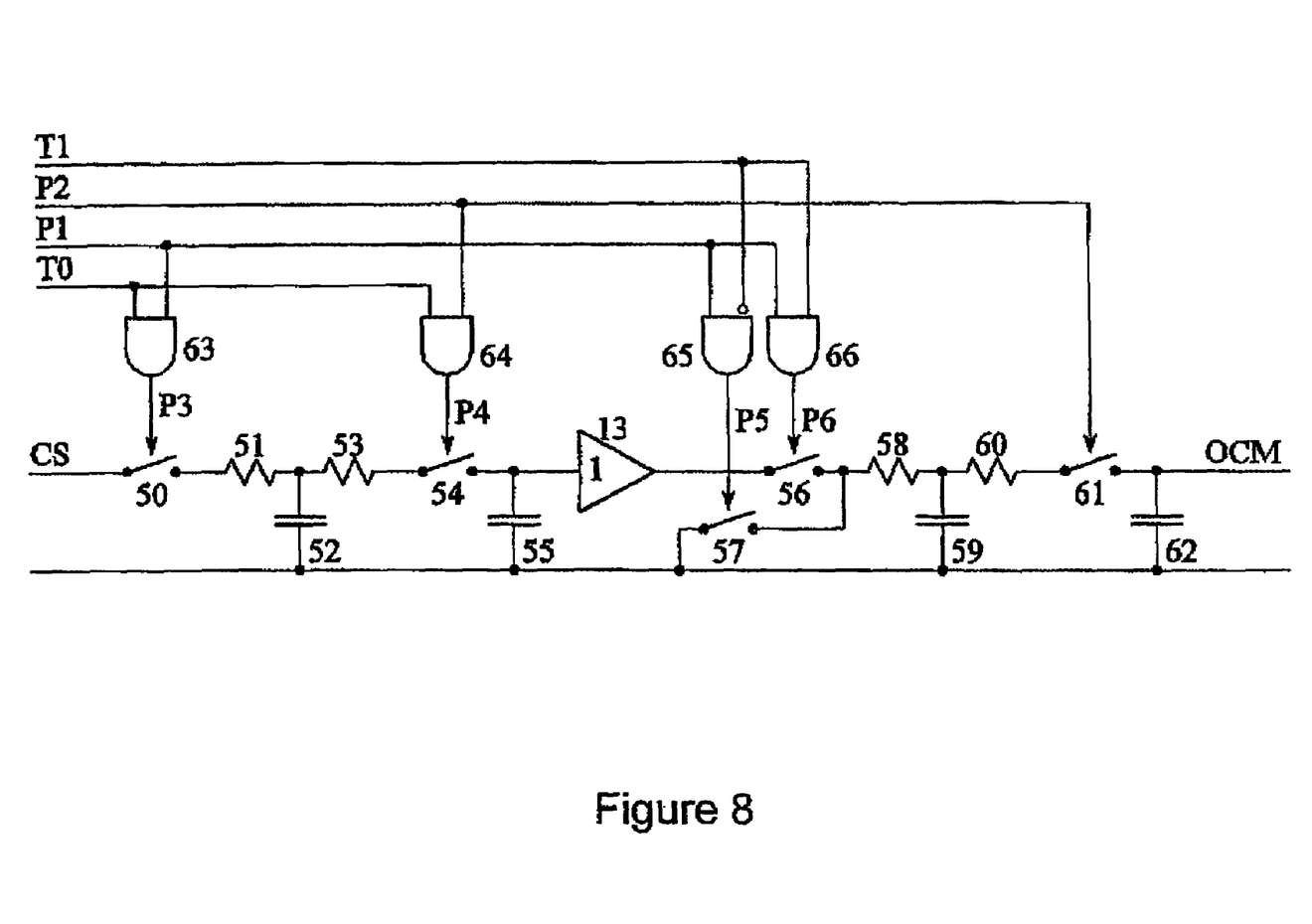
FIG. 8 shows an example of a preferred implementation of the low-pass filter based current model of FIG. 6 using a switched capacitor circuit with time-sliced resistive components.

An embodiment of the current model block is shown in FIG. 8. Here the resistors 51, 53, 58, and 60 have been inserted in series with the switches. The concept is that by limiting the charge deposited on the capacitors 52 and 59 the charge per switching cycle, hence the current, is decreased. Therefore the equivalent resistance is increased (as described further later). The first order estimates of the time constants are:

$$\begin{cases} \tau_{12} = 2R_{51}C_{55}/D \\ \tau_{16} = 2R_{58}C_{62}/D \end{cases}$$

where D is the duty cycle (percentage on time) of the signals P1 and P2, under the assumptions:

$$R_{51} = R_{53}$$
$$R_{58} = R_{60}$$
$$D/f_s \ll \begin{cases} R_{51}C_{52} \ll \tau_{12} \\ R_{58}C_{59} \ll \tau_{16} \end{cases}$$

In an example embodiment the time constants of the low-pass filters 12 and 16 are of the order of 1 ms and the switching frequency $f_s$ is greater than MHz. An example duty cycle is of order 10% (for a sampling frequency of, say, 10 MHz giving 10 ns wide pulses every 100 ns for P1 and P2), which magnifies the values of resistors 51 and 53, and of resistors 58 and 60, by a factor of 10. As an example the switching period of an SMPS as shown in FIG. 1 may be in the region of 50 KHz to 500 KHz, for example approximately 65 KHz, in which case T1 is order 5 μs and T0 is of order 2 to 3 μs. The skilled person will understand that the figures are given merely as examples to aid understanding of embodiments of the invention, and should not be considered limiting.

Controller

Figure 10:
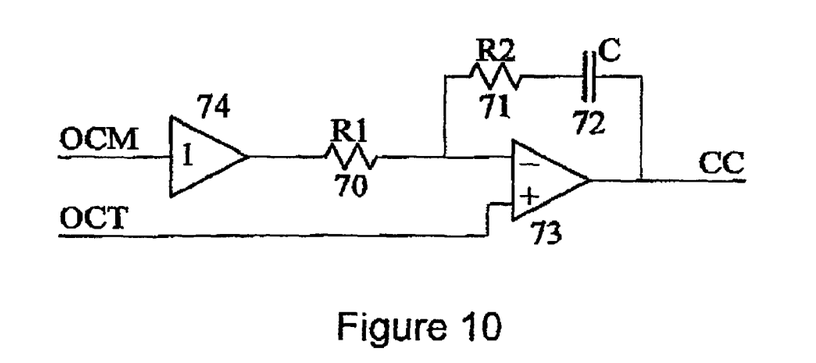
FIG. 10 shows an example implementation of the controller (CTRL) module of FIG. 1.

An example embodiment of the controller 26 of FIG. 1 is shown in FIG. 10. The main function of the controller is the integration of the difference between the OCM and OCT signals, performed by action of the resistor 70, the capacitor 72, and the amplifier 73. Together they form an inverting integrator. If the output current is too high, the difference OCM-OCT will be positive, and the signal CC will decrease which reduces the output power of the SMPS (and vice versa for a too low output current).

The purpose of resistor 71 is to cancel the pole from the CM 28 by inserting a zero. This way the transfer function from 0° C. to CC only has one dominant pole at zero frequency. The purpose of the buffer 74 is to reduce the load on the low-pass filter 16 in the current model 28.

Driver

The driver 25 in FIG. 1 may comprise a pulse-width and/or pulse-frequency modulator that controls the DRIVE signal. The DRIVE signal turns on and off the primary side switch 31. The width and frequency of the DRIVE signal controls the power delivered to the secondary side of the transformer 21. The input signal CC preferably controls the driver 25 such that the power delivered to the secondary side is linearly dependent on (increases monotonically with respect to) the input signal CC. For further details reference may be made to the applicant's co-pending applications PCT/GB2005/050244, PCT/GB2005/050242, GB 0526118.5 (all of which applications are hereby incorporated by reference in their entirety).

Switched Capacitor Filters

Figure 12:
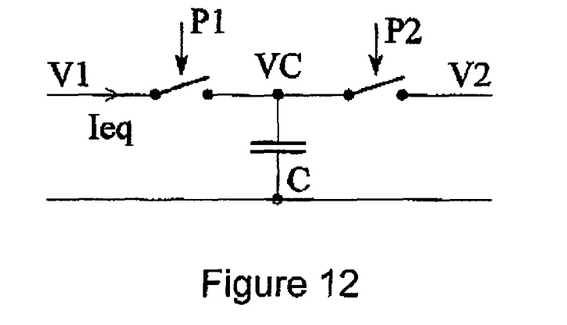
FIG. 12 illustrates a first example of a switched capacitor (SC) resistor.
Figure 14:
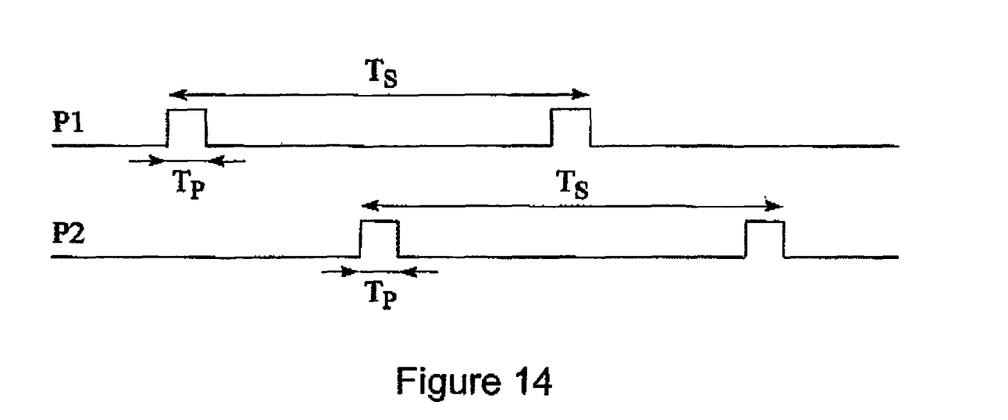
FIG. 14 shows example switch control waveforms for the switched capacitor (SC) circuits of FIGS. 12 and 13.

A resistor can be implemented using a switched capacitor circuit as shown in FIG. 12. The clock signals P1 and P2 are plotted in FIG. 14. For every clock cycle the net charge transported from node V1 to node V2 in FIG. 12 equals:

$$\Delta Q = C(V1-V2) = I_{eq}T_S$$

Therefore the equivalent resistance is:

$$R_{eq} = \frac{V1-V2}{I_{eq}} = \frac{T_s}{C}$$

Figure 13:
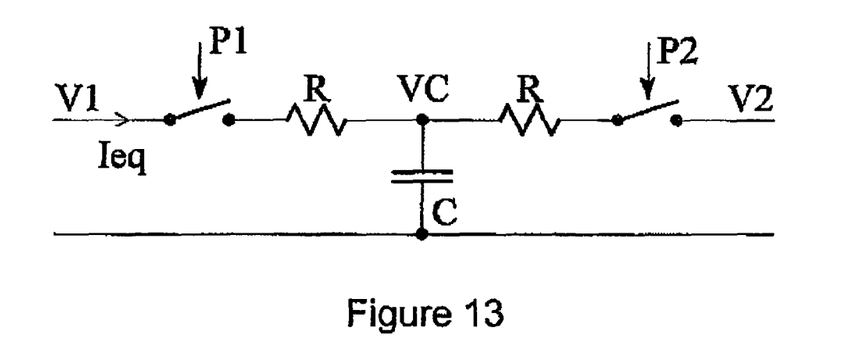
FIG. 13 shows an embodiment of a switched capacitor resistor according to an aspect of the invention.

In the modified SC resistor circuit in FIG. 13 two resistors have been added in series with the switches. If the time constant of $RC \gg T_P$ and the signals V1 and V2 are slow, then the voltage VC converges to:

$$VC = \frac{V1+V2}{2}$$

For every clock cycle the net current transported from node V1 to node V2 in FIG. 13 equals:

$$I_{eq} = \frac{V1-VC}{R} \cdot \frac{T_p}{T_s} = \frac{V1-V2}{2R} \cdot \frac{T_p}{T_s}$$

Therefore the equivalent resistance is:

$$R_{eq} = 2R\frac{T_p}{T_s}$$

Broadly speaking a method of using low-pass filters to produce an output current model for a switch mode power supply and hence estimate the output current of the switch mode power supply, in particular by means of primary-side sensing is described. In some embodiments the output current model may be implemented using switched-capacitor filters, in some particularly preferred embodiments using resistors in series with the switches in such a switched-circuit. In embodiments three signals are employed in order to create the output current model, the charge time of the primary side of the magnetic energy storage device (transformer), a primary winding current signal, and the discharge time of the secondary side. These signals may be generated using a voltage sense signal comprising a reflected voltage of the secondary of the transformer, a current sense signal that represents the current on the primary side, and a DRIVE signal that represents the on-time of the primary (power) switch. In embodiments a controller for an SMPS uses this current model to control the secondary side output current of the SMPS.

However embodiments may also be employed in conjunction with a voltage control loop, preferably a primary-side sensing voltage control loop, to implement constant-voltage, constant-current control. We have previously described a number of different techniques which may be employed for output voltage regulation using primary side feedback, for example in UK patent applications numbers 0610206.5, 0610210.7, 0610208.1 and 0610211.5 all filed by the present applicant on 23 May 2006, all hereby incorporated by reference in their entirety. For example, in one technique a decaying peak detector is employed to provide a signal approximating a tangent to the decaying secondary side waveform (reflected in the primary or an auxiliary winding waveform), the output voltage being sampled at the knee in the reflected secondary side voltage waveform, at which point because substantially no current is flowing to the SMPS output the secondary side voltage accurately reflects the output voltage of the SMPS. In another technique the primary (or an auxiliary) voltage waveform is integrated from a point of known zero flux (and hence current) in the transformer immediately prior to switching on the power device, the point at which the integrated signal is again equal to zero corresponding to the next point at which the flux (and hence secondary current) in a transformer is zero. This signals at the point at which to sample the voltage on the auxiliary (or a primary) winding in order to obtain an accurate indication of the SMPS output voltage.

The operation of embodiments of the above-described output current estimation technique in the context of an example of an SMPS operating in a Discontinuous Conduction Mode (DCM) is described herein, but the techniques also work in Critical Conduction Mode and in Continuous Conduction Mode (CCM) since no particular shape is assumed for the waveforms involved; instead the described signal processing employs the actual, sensed signal waveforms.

No doubt many other effective alternatives will occur to the skilled person. It will be understood that the invention is not limited to the described embodiments and encompasses modifications apparent to those skilled in the art lying within the spirit and scope of the claims appended hereto.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

All documents, patents, and other references listed above are hereby incorporated by reference for any purpose. However, were any statement of these incorporated documents conflicts with the present disclosure, the present disclosure governs interpretation.

We claim:

1. A module for estimating the output current of a switch mode power supply (SMPS), said SMPS including a transformer with at least a primary winding coupled to an input of the SMPS and a secondary winding coupled to an output of the SMPS and having a power switching device to switch power to said primary winding of said transformer responsive to a drive signal, the module comprising:
    a current sense input to receive a current sense signal sensing a current in said primary winding of said transformer;
    a voltage sense input to receive a voltage sense signal from at least one of said primary and an auxiliary winding of said transformer;
    a drive signal input to receive said drive signal;
    a signal averager coupled to said drive signal input and to said current sense input to average said current sense signal over a period when said drive signal is controlling said power switching device to apply power to said primary winding and to provide an averaged current sense signal;
    a timing signal generator coupled to said voltage sense input to generate a timing signal indicating a duration of a period during which said secondary winding is providing power to said SMPS output;
    a multiplier coupled to an output of said signal averager and to an output of said timing signal generator to multiply said averaged current sense signal by a fraction of a total cycle period of said SMPS, indicated by said timing signal, during which said secondary winding is providing power to said SMPS output; and
    an output coupled to an output of said multiplier to provide a signal estimating said output current of said SMPS.

2. A module as claimed in claim 1 wherein said signal averager comprises a first low-pass filter coupled to said current sense input by a first switch, and wherein said switch is configured for control by said drive signal.

3. A module as claimed in claim 2 wherein at least one of said first and second low-pass filters comprises a switched capacitor filter.

4. A module as claimed in claim 3 wherein said switched capacitor filter includes a switched capacitor resistor.

5. A module as claimed in claim 4 wherein said switched capacitor resistor comprises first and second terminals and an intermediate terminal, a capacitor being connected to said intermediate terminal and a resistor, and a controllable switch being series connected between each of said first and second terminals and said intermediate terminal.

6. A module as claimed in claim 1 wherein said multiplier comprises a second low-pass filter having an input coupled to said signal averager output by a second switch, and having a third switch to couple said second low-pass filter input to a reference level, and wherein said second and third switches are configured for control by said timing signal such that one of said second and third switches is on when the other is off.

7. A module as claimed in claim 1 wherein said timing signal generator comprises a comparator to compare said voltage sense signal with a reference to generate said timing signal.

8. An SMPS controller including an output current estimating module as claimed in claim 1.

9. An SMPS controller as claimed in claim 8 further comprising a control module having a first input to receive a target output current signal defining a target output current, and having a second input coupled to said output current estimating module to receive said output current estimating signal, and having a control output to provide a signal for controlling said SMPS responsive to a difference between said estimated output current and said target output current.

10. An SMPS controller as claimed in claim 9 wherein said control module has a zero configured to suppress a pole of said output current estimating module.

11. An SMPS controller as claimed in claim 8 further comprising a power switch driver module to provide said drive signal responsive to said output current estimating signal from said output current estimating module.

12. An SMPS including a module as claimed in claim 1.

13. The module of claim 1, wherein the switched capacitor resistor that is controlled by a time-slicing signal having a duty cycle of less than 100%.

14. A module for estimating the output current of a switch mode power supply (SMPS), comprising:
    a current sense input to receive a current sense signal sensing a current in said primary winding of said transformer;

a voltage sense input to receive a voltage sense signal from at least one of said primary and an auxiliary winding of said transformer;

a drive signal input to receive said drive signal;

a signal averager coupled to said drive signal input and to said current sense input to average said current sense signal over a period when said drive signal is controlling said power switching device to apply power to said primary winding and to provide an averaged current sense signal, wherein said signal averager comprises a first low-pass filter coupled to said current sense input by a first switch, and wherein said first switch is configured for control by said drive signal;

a timing signal generator coupled to said voltage sense input to generate a timing signal indicating a duration of a period during which said secondary winding is providing power to said SMPS output;

a multiplier coupled to an output of said signal averager and to an output of said timing signal generator to multiply said averaged current sense signal by a fraction of a total cycle period of said SMPS, indicated by said timing signal, during which said secondary winding is providing power to said SMPS output, wherein said multiplier comprises a second low-pass filter including an input coupled to said signal averager output by a second switch, and including a third switch to couple said second low-pass filter input to a reference level, and wherein said second and third switches are configured for control by said timing signal such that one of said second and third switches is on when the other is off; and an output coupled to an output of said multiplier to provide a signal estimating said output current of said SMPS.

15. A module according to claim 14, wherein at least one of said first and second low-pass filters comprises a switched capacitor filter.

16. A module according to claim 15, wherein said switched capacitor filter includes a switched capacitor resistor.

17. A module according to claim 16, wherein said switched capacitor resistor comprises first and second terminals and an intermediate terminal, a capacitor being connected to said intermediate terminal and a resistor, and a controllable switch being series connected between each of said first and second terminals and said intermediate terminal.

18. A module according to claim 17, wherein said timing signal generator comprises a comparator to compare said voltage sense signal with a reference to generate said timing signal.

19. A switch mode power supply (SMPS) controller including an output current estimating module as claimed in claim 14.

20. A switch mode power supply (SMPS) controller as claimed in claim 19, further comprising a control module having a first input to receive a target output current signal defining a target output current, and having a second input coupled to said output current estimating module to receive said output current estimating signal, and having a control output to provide a signal for controlling said SMPS responsive to a difference between said estimated output current and said target output current.

21. A switch mode power supply (SMPS) controller as claimed in claim 20, wherein said control module has a zero configured to suppress a pole of said output current estimating module.

22. A switch mode power supply (SMPS) controller as claimed in claim 21, further comprising a power switch driver module to provide said drive signal responsive to said output current estimating signal from said output current estimating module.

* * * * *